United States Patent [19]

Vacha et al.

[11] Patent Number: 5,567,219

[45] Date of Patent: Oct. 22, 1996

[54] POLYIMIDE COATED HEAVY METAL FLUORIDE GLASS FIBER AND METHOD OF MANUFACTURE

[75] Inventors: Lubos Vacha; Peter J. Melling, both of Sturbridge, Mass.

[73] Assignee: Galileo Electro-Optics Corporation, Sturbridge, Mass.

[21] Appl. No.: 277,870

[22] Filed: Jul. 20, 1994

[51] Int. Cl.$^6$ ............................ C03C 25/02; G02B 6/02; G02B 6/16

[52] U.S. Cl. ................ 65/432; 65/388; 65/389; 65/430; 385/123

[58] Field of Search .............................. 65/388, 389, 430, 65/432; 385/123, 144, 145

[56] References Cited

U.S. PATENT DOCUMENTS

| | | |
|---|---|---|
| 4,274,709 | 6/1981 | Asai . |
| 4,388,093 | 6/1983 | Kimura et al. ............................ 65/432 |
| 4,504,298 | 3/1985 | Yokota et al. . |
| 4,652,288 | 3/1987 | Saito ........................................ 65/389 |
| 4,737,012 | 4/1988 | Murakami et al. . |
| 5,055,120 | 10/1991 | Tran et al. ............................ 65/432 X |
| 5,248,519 | 9/1993 | Stoakley et al. . |
| 5,298,291 | 3/1994 | Klinger et al. . |
| 5,349,590 | 9/1994 | Amirkhanian et al. . |
| 5,381,505 | 1/1995 | Fischietto et al. . |

FOREIGN PATENT DOCUMENTS

| | | |
|---|---|---|
| 59-174547 | 10/1984 | Japan . |
| 59-231503 | 12/1984 | Japan . |
| 62-178908 | 8/1987 | Japan . |
| 63-201031 | 8/1988 | Japan ........................................ 65/432 |
| 2156336 | 9/1984 | United Kingdom . |

*Primary Examiner*—David A. Simmons
*Assistant Examiner*—M. Curtis Mayes
*Attorney, Agent, or Firm*—Watson Cole Stevens Davis, P.L.L.C.

[57] ABSTRACT

A method of making a polyimide coated heavy metal fluorinated fiber includes the steps of drawing an optical fiber through a low-temperature curing polyimide solution to form a polyimide coating which cures in a range of about 200° and 390° C. A low curing temperature enables a low temperature profile to be used for curing the coating. The low-temperature curing conditions provide a maximum fiber exposure temperature above the glass transition temperature of the fiber but minimize crystallization of the fiber during curing. The method is also applicable to chalcogenide fibers which carry optical signals in the infrared region.

30 Claims, 3 Drawing Sheets

POLYIMIDE COATED HEAVY METAL FLUORIDE GLASS FIBER AND METHOD OF MANUFACTURE

FIELD OF THE INVENTION

The present invention relates to a coated optical fiber, and method of manufacture. More specifically, the present invention relates to a heavy metal fluoride glass fiber coated with a low-temperature curing fluorinated polyimide solution and a temperature controlled curing process therefor which results in a fiber having reduced losses.

BACKGROUND OF THE INVENTION

Heavy metal fluoride glass fibers are known to transmit wavelengths in the infrared region. Such fibers can have minimum optical losses in the range of 1–10 dB/km. Heavy metal fluoride fibers find applications in the fields of spectroscopy, laser power delivery in medicine and temperature sensing, and other fields using medium loss fibers (<30 dB/km) which are optically satisfactory in short length applications. Major efforts have been made to minimize such optical loss and it is expected that heavy metal fluoride fibers may soon transmit telecommunication signals.

Unfortunately, heavy metal fluoride fibers have poor chemical durability, and are therefore not well suited for long term telecommunications applications. There thus exists a need for a heavy metal fluoride fiber which has low optical losses yet is chemically durable and provides a long useful lifetime.

Polyimide coatings are used to increase the chemical durability of silica fibers. Unfortunately, the polyimide coatings used in present silica fiber applications cure at temperatures which are far too high for fluoride fibers that have a glass transition temperature (Tg) of less than 300° C. Typical curing temperatures (e.g. 400°14 500° C.) of current polyimide coatings are hundreds of degrees Celsius below the glass transition temperature of silica fibers. However, temperatures of 400°14 500° C. are sufficient to cause crystallization of heavy metal fluoride glass fibers which adversely affects the optical properties of the fiber.

The known polyimide solutions currently used include solutions of polyamic acid in 1-methyl-2-pyrrolidinone (NMP). Unfortunately, most known polyimide coatings cure at high temperatures. While some polyimide coatings have been made for temperature sensitive optical fibers, those coatings nonetheless cure at temperatures well above the glass transition temperature of most heavy metal fluoride fibers.

A need therefore exists for a protective coating which renders heavy metal fluoride fibers chemically durable. A need also exists for a method of applying a protective coating which cures without causing crystallization of the heavy metal fluoride fiber.

SUMMARY OF THE INVENTION

The present invention is based upon the discovery that a temperature sensitive heavy metal fluoride fiber may be protected with a polyimide coating which comprises a polymer that has a curing temperature above the glass transition temperature of the fiber. According to the invention, the polymer can be cured without substantial crystallization of the fiber. The resulting fiber is durable and has good optical properties.

The invention relates to a method for manufacturing such a coated heavy metal fluoride fiber by applying a low-temperature curing polyimide solution to the fiber and curing the solution in a furnace set above the glass transition temperature of the fiber under conditions which minimize crystallization of the coated fiber. The present invention more specifically relates to a method for coating a heavy metal fluoride fiber with a solution of polyamic acid in 1-methyl- 2-pyrrolidinone (NMP) and curing the solution to provide a coated fiber having both low optical losses and high chemical durability. The polyamic acid comprises a monomer composition and backbone structure which results in a relatively low curing temperature. Under such low curing conditions, the fiber is not exposed to a heating cycle sufficient to result in any substantial crystallization of the fiber.

The method comprises the steps of forming a coated optical fiber by drawing the optical fiber through a polyimide solution; and drawing the coated fiber through a curing oven to form a cured coated fiber. The polyimide coating has a curing temperature of between about 200° and about 390° C., and more preferably below about 300° C. An oven temperature profile is selected which provides a set point temperature sufficient to cure the coating. The temperature profile and draw rate through the oven are also selected such that the coated fiber is exposed to temperatures above the glass transition temperature of the fiber but under conditions which minimize substantial crystallization of the fiber during curing. The result is a coated fiber exhibiting both low optical losses and high chemical durability. Oven temperature profiles which provide set point temperatures of between 360° and 460° C. and maximum temperatures of between about 420° and about 520° C. are preferred according to one embodiment of the invention.

BRIEF DESCRIPTION OF THE DRAWINGS

The invention may be more fully understood with reference to the accompanying drawings, wherein.

DETAILED DESCRIPTION OF THE INVENTION

Figure 1:
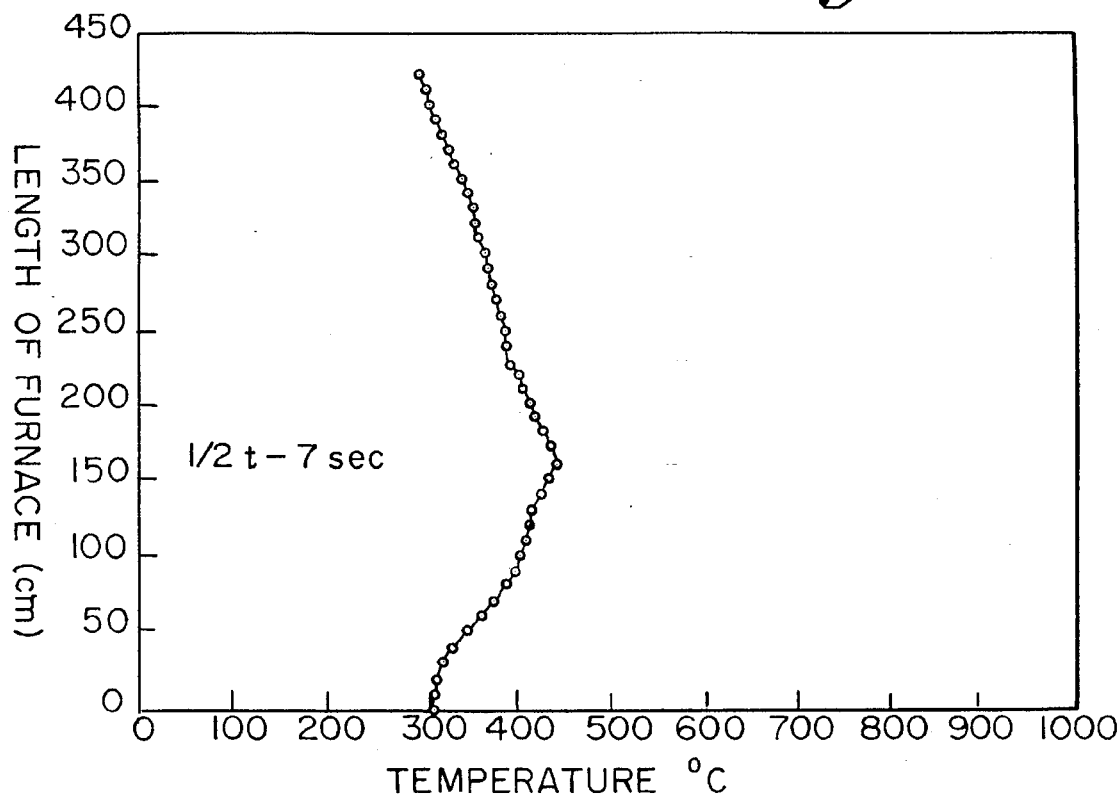
FIG. 1 shows a temperature profile for a curing oven used to cure the coatings on the samples identified in Tables I and II.

A durable heavy metal fluoride fiber is produced which has good optical properties. According to the invention, the fiber has a coating formed by drawing the fiber through a polyimide solution, and drawing the coated fiber through a curing oven to form a cured coated fiber. As used herein, the term heavy metal fluoride fiber refers not only to fibers containing heavy metals but also to those containing some lighter metals, specifically lithium, sodium, beryllium or aluminum. The method is also applicable to chalcogenide fibers which carry optical signals in the infrared region and to both single mode and multi-mode fibers.

According to an embodiment of the invention, the coating is formed of a polyimide solution of polyamic acid in 1-methyl-2-pyrrolidinone (NMP). The monomer composition and backbone structure of the polyamic acid solution yields a coating which cures at a temperature of between about 200° and about 390° C. The coated fiber is drawn or otherwise passed through an oven to effect curing of the coating. An oven temperature profile is selected which provides a set point temperature sufficient to cure the coating while avoiding substantial crystallization of the fiber.

The polyimide coated heavy metal fluoride fiber can further be coated with additional protective coatings. According to one embodiment of the invention, an epoxy acrylate coating is provided to further enhance the chemical durability of the fiber.

The present invention is particularly suited for optical fibers drawn from heavy metal fluoride glass preforms substantially free of silica and oxides. According to one embodiment, fibers are drawn from a glass preform which contains fluorides of: zirconium, barium, lanthanum, aluminum, sodium, lithium, beryllium, hafnium and/or lead. Glass transition temperatures (Tg) for these heavy metal fluoride fibers range from about 200° to about 400° C. and are typically about 265° C.

One group of fibers particularly suited to be coated according to the present invention include double cladded high numerical aperture (NA) and low NA fibers comprising the following metal fluorides in the indicated mole percentages:

| Metal Fluoride | mol % | | |
|---|---|---|---|
| | Core | 1st Cladding | 2nd Cladding |
| Composition of High NA Fibers | | | |
| ZrF$_4$ | 50–60 | 5–12 | 10–20 |
| BaF$_2$ | 10–24 | 10–24 | 10–24 |
| LaF$_3$ | 2–6 | 2–6 | 2–6 |
| AlF$_3$ | 0–5 | 0–6 | 0–6 |
| NaF | 0–20 | 10–30 | 10–30 |
| HfF$_4$ | 0 | 30–45 | 30–45 |
| PbF$_2$ | 0–12 | 0 | 0 |
| LiF | 10–20 | 0–10 | 0–10 |
| YF$_3$ | 0–5 | 0–5 | 0–5 |
| Composition of Medium NA Fibers | | | |
| ZrF$_4$ | 50–60 | 30–50 | 30–50 |
| BaF$_2$ | 10–24 | 10–24 | 10–24 |
| LaF$_3$ | 0–6 | 0–6 | 0–6 |
| AlF$_3$ | 0–5 | 0–5 | 0–5 |
| NaF$_3$ | 10–20 | 10–28 | 10–28 |
| HfF$_4$ | 0 | 10–20 | 10–20 |
| PbF$_2$ | 0–10 | 0 | 0 |

Other heavy metal fluoride fibers which can be coated according to the present invention are those used for fiber lasers and fiber amplifiers. Particular fibers include those doped with Praseodymium, Neodymium, Promethium, Samarium, Europium, Gadolinium, Terbium, Dysprosium, Holmium, Erbium, Thulium, Ytterbium, Lutecium, and combinations thereof.

Fiber structures for some suitable single mode fibers include core diameters ranging from 0.5 to 6 microns and outer diameters of 100 to 150 microns, particularly 125 microns. Single made fibers having numerical apertures of from 0.15 to 0.45 are also suitable. Exemplary fibers include the following three (3) embodiments:

| | NA | Core diameter (μm) | Fiber OD (μm) | Coated Fiber O.D. (μm) |
|---|---|---|---|---|
| (1) | .2 | 3.0 | 125 | 140 |
| (2) | .3 | 2.0 | 125 | 140 |
| (3) | .4 | 1.7 | 125 | 140 |

The coating solution employed in accordance with the invention comprises polyimide or a polyimide precursor such as polyamic acid. The coating solution cures at relatively low temperatures, i.e., 200° to 390° C. The solutions form a fluorinated thermoplastic polyimide film upon solvent removal and cure. One preferred fluorinated polyimide solution cures at a temperature below 300° C.

Particular solutions suitable for carrying out the method of the present invention were previously available from Ethyl Corporation, Baton Rouge, La., as EYMYD® RESINS HP-1125, HP-2000, HP-3000, HP-3025X, HP-4000, LT-1 and L-30N. Other useful low-temperature curing polyimide solutions are disclosed in U.S. Pat. No. 4,203,927 and are available from Poly-Materials, Inc., Jackson, Miss.

One polyamic acid solution suitable for the instant method comprises a polyamic acid composition and backbone structure which provides a low curing temperature in a range of about 200° and about 390° C. Under such low curing conditions the coated heavy metal fluoride fiber is not exposed to a temperature above the fiber glass transition temperature because the heat is mostly absorbed by solvent evaporation and the polymer and is utilized for curing of same.

According to one embodiment of the invention, the solution used to form the coating provides about 24% by weight polyimide after curing and may be cured at a temperature of less than 300° C. The solution may comprise a clear, golden, high purity solution of polyamic acid in 1-methyl-2-pyrrolidinone (NMP), which has a boiling point of about 200° C., a viscosity in a range of about 5000 and about 7000 Cp at 25° C., and a density of about 1.13 g/ml at 20° C. Other solvents may be used.

According to one embodiment, a fluorinated polyamic acid solution is used as the coating solution. Upon curing, a fluorine containing thermoplastic polyimide coating results.

According to another embodiment of the invention, the coated fiber has a polyimide coating thickness in a range about 3 and about 25 microns. More specifically, the coated fiber has a polyimide coating thickness in a range of about 5 and about 20 microns, with a thickness in a range of about 8 and about 10 microns being particularly preferred. Thin coating thicknesses offer excellent chemical durability to the coated fiber. Thin coatings also minimize the time and temperature needed for curing and avoid the creation of pinholes in the coating. In particular, when thin coatings are provided, concentricity becomes important and must continually be monitored and fine-tuned.

The draw rate of the coated heavy metal fluoride fiber through the curing oven depends upon a number of factors, including the temperature profile through the oven, the length of the oven, the thickness of the coating, and the curing temperature. Faster draw rates result in faster production of coated fiber. The combination of low curing temperatures and fast draw rates also prevent substantial crystallization of the fiber by minimizing exposure of the fiber to temperatures above its Tg. The risk of crystallization must be balanced against the need to completely cure the polyimide coating and remove NMP solvent to provide maximum protection against moisture. According to the present invention, a heating profile is used to form coated heavy metal fluoride fibers which exhibit low optical losses and high chemical durability.

According to the invention, the coated fiber may be drawn through the oven at a rate of between about 1 and about 12 meters per minute. More specifically, the coated fiber may be drawn through the oven at a rate of between about 2 and about 6 meters per minute. According to yet another embodiment, the coated fiber may be drawn through an oven at a rate of between about 2 and about 3 meters per minute. The fiber may also be drawn through the oven two or more times to effect curing of the coating. The fiber may be exposed to the complete oven temperature profile for between about 10 and about 20 seconds. Pressures lower than atmospheric may also be maintained in the oven to accelerate solvent removal.

According to the present invention, the heating profile provided in the oven yields a set point temperature in a range of about 360° and about 460° C. at a centrally located thermocouple in the oven. According to one embodiment of the invention, the oven temperature profile has a set point of about 390° C. and a maximum fiber exposure temperature of about 460° C. for curing a coating solution of polyamic acid in NMP having a curing temperature of less than 300° C. Maximum temperatures of between about 460° and 480° C. are particularly preferred for solutions comprising polyamic acid in NMP which cure below 300° C. and provide resultant polyimide weights of about 24% after cure.

To avoid or minimize glass crystallization, the fiber should be exposed to the maximum temperature along the oven heating profile for only a short time. Unfortunately, most ovens employing a resistance winding have a high temperature region, usually near the center of the oven. Thus, in typical curing ovens, in order to provide a temperature profile set point of 360°, 390° or 460° C., the fiber will be exposed to a corresponding maximum temperature of about 420°, 460° or 520° C., respectively. According to one embodiment of the invention, the maximum temperature range of between about 460° and about 480° C. is preferred. These temperatures are above the glass transition temperature of all the heavy metal fluoride glass fibers used in the methods according to the present invention. Thus, in accordance with the invention, the maximum temperature is about 100° C. above the glass transition temperature. The heavy metal fluoride glass fibers typically have glass transition temperatures of between about 200° and about 400° C., many of them around 265° C. Thus, it is advantageous to minimize the exposure time at the maximum temperature. According to the invention, exposure times of between about 5 and about 7 seconds have shown little effect on crystallization of standard fibers. It is believed that solvent evaporation and polymerization of the coating absorbs much of the heat and protects the fiber from crystallization.

The present invention may be more fully understood with reference to the Examples which follow. The invention is not intended to be limited to the embodiments shown and discussed in the Examples below but should be considered as contemplating all modifications within the purview of an ordinary artisan.

EXAMPLES

Fibers were drawn from ZBLAN based glass preforms in an inductively heated furnace and under a protective nitrogen atmosphere to a total diameter of 330µ and a core diameter of 250µ. The draw rate was approximately two to three meters per minute. A soft silicon die was used to apply a polyimide coating having a thickness of about 10µ on the fibers. The coater was carefully aligned to assure concentricity and fine tuned during the draw. Curing was accomplished in a resistance heated furnace 26 inches in length. Set point curing temperatures were varied between 360° and 460° C. and maximum exposure temperatures varied between 420° and 520° C. respectively.

After the draw, optical losses were measured to determine whether the curing introduced an increase in loss due to crystal growth in the fiber. A Laser Precision Analytical RFX-30 FTIR Spectrophotometer was used to measure cut-back loss. Samples of the fibers were tested for strength by utilizing a two point bend tester.

Some of the fibers were overcoated with epoxy acrylate available as DESOLITE® 950–132 from DSM Desotech, Inc., Elgin, Ill., and bend tested again.

All fibers were subjected to a durability test comprising submersion in deionized water at room temperature and under stress, using a bend radius of 2.5 inches. The typical fiber length of the tested samples was 15 inches and bunches of 10 fibers were tested at a time. Some fibers were subjected to boiling deionized water to accelerate the tests.

Table I shows the relationship between the number of surviving fibers over time when the standard epoxy acrylate coated fibers were subjected to a durability test.

TABLE I

| Number of Surviving Fibers | Time (mins) |
| --- | --- |
| 10 | 2 |
| 10 | 4 |
| 9 | 6 |
| 6 | 8 |
| 5 | 10 |
| 4 | 12 |
| 3 | 13 |
| 2 | 14 |
| 0 | 15 |

Some fibers were cured at a maximum temperature of 420° C. and respooled on a metal wire spool and cured again off-line at 190° C. for 20 hours.

Another batch of fibers was cut to a length of one foot and cured at 170° C. for 30 minutes without being wound on the spool. This procedure avoided memorizing of the coating and permanent curvature.

The lifetimes of fibers coated according to the present invention were compared to the lifetime of a typical standard heavy metal fluoride fiber having a core diameter of 250µ, a cladding thickness of 40µ, and a total thickness including the cladding of 330µ. The standard heavy metal fluoride fibers were coated with the epoxy acrylate DESOLITE® 950–132 From DSM Desotech, Inc. Durability of the epoxy acrylate coated fibers was tested by submersing a group of 10 fibers in deionized water and performing a two point bend test at a bend radius of 2.5 inches. The results are shown in Table II. As indicated, the lifetime of the standard epoxy acrylate coated fibers under these conditions was relatively short. All 10 standard fibers broke within 15 minutes of the exposure and bending.

Heavy metal fluoride fibers were coated to a thickness of 8–10µ in a single pass with EYMYD® LT-1, a low-temperature curing solution of polyamic acid in NMP.

Six (6) groups of ten (10) coated fibers were produced under the conditions shown for samples 1–6 in Table II below. Of samples 1–6, all ten fibers in sample 3 survived 48 hours of the same bend test used on the epoxy coated standard fibers. Half of the sample 3 fibers survived 768 hours as indicated in Table III.

TABLE II

| Sample # | Set Point (°C.) | Max. Temp. (°C.) | Draw Rate (m/min) | Loss (dB/km) |
| --- | --- | --- | --- | --- |
| 1 | 365 | 405 | 2.0 | 42 |
| 2 | 365 | 405 | 2.8 | 31 |
| 3 | 460 | 520 | 2.6 | 56 |
| 4 | 360 | 420 | 2.8 | 14 |
| 5 | 390 | 465 | 2.6 | 22 |
| 6 | 395 | 468 | 2.6 | 12 |

Table III shows the results of durability tests conducted on sample 3 fibers from Table II.

TABLE III

| Number of Surviving Fibers | Time (hours) |
| --- | --- |
| 10 | 48 |
| 9 | 96 |
| 9 | 288 |
| 8 | 336 |
| 8 | 384 |
| 7 | 432 |
| 7 | 624 |
| 6 | 672 |
| 5 | 720 |
| 5 | 768 |

The sample 3 group of fibers from Table II drawn at 2.6 meters per minute had a residence time within the 26 inch oven of 15 seconds. Due to the oven temperature profile shown in FIG. 1, the fiber was exposed to a temperature above its Tg (265° C.) for 15 seconds. However, because the polyimide curing process involves NMP solvent evaporation, requiring heat, a portion of the heat from the oven is absorbed by the coating, not by the fiber. The fiber did not crystallize.

Figure 2:
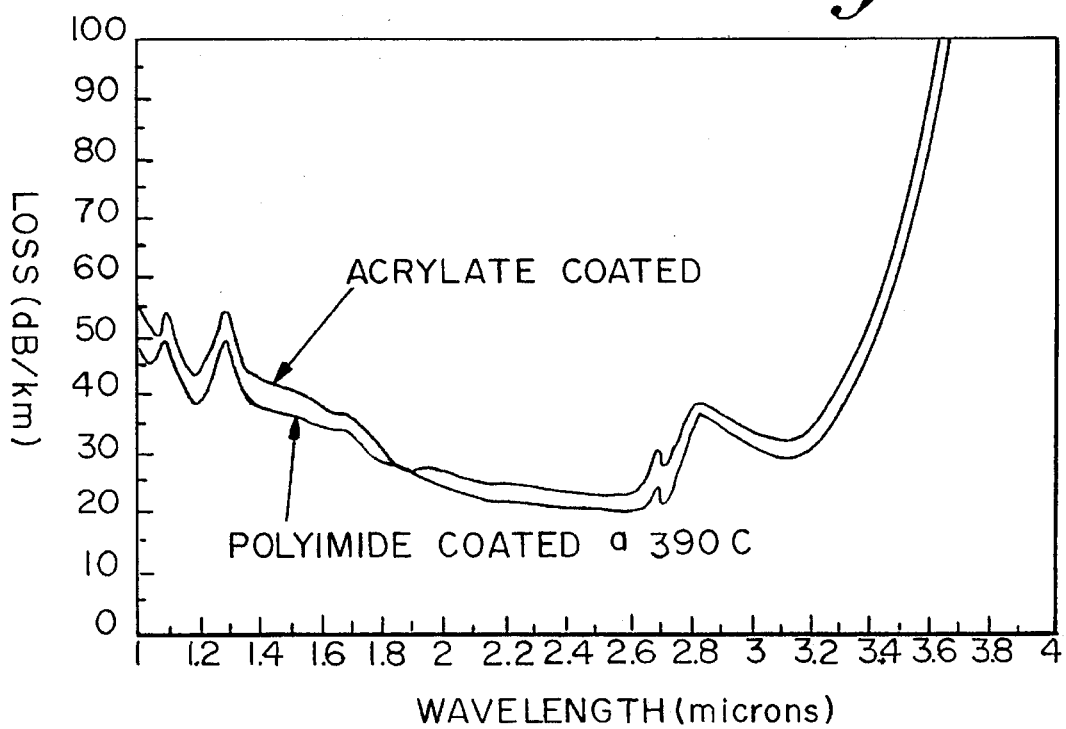
FIG. 2 is a graph showing the slope of optical loss plotted at wavelengths 1–2.4μ for selected samples identified in Table II compared to the slope for standard epoxy acrylate coated fibers identified in Table I.

To confirm that little or no crystallization took place which would affect optical loss, the slope of the loss plot at wavelengths 1–2.4μ for the sample 5 fibers cured at 390° C. was compared to that of the standard epoxy acrylate coated fibers. The comparison is shown in FIG. 2. As can be seen, the losses were comparable and even lower in those fibers cured according to the present invention when compared to the standard epoxy acrylate coated fibers.

Figure 3:
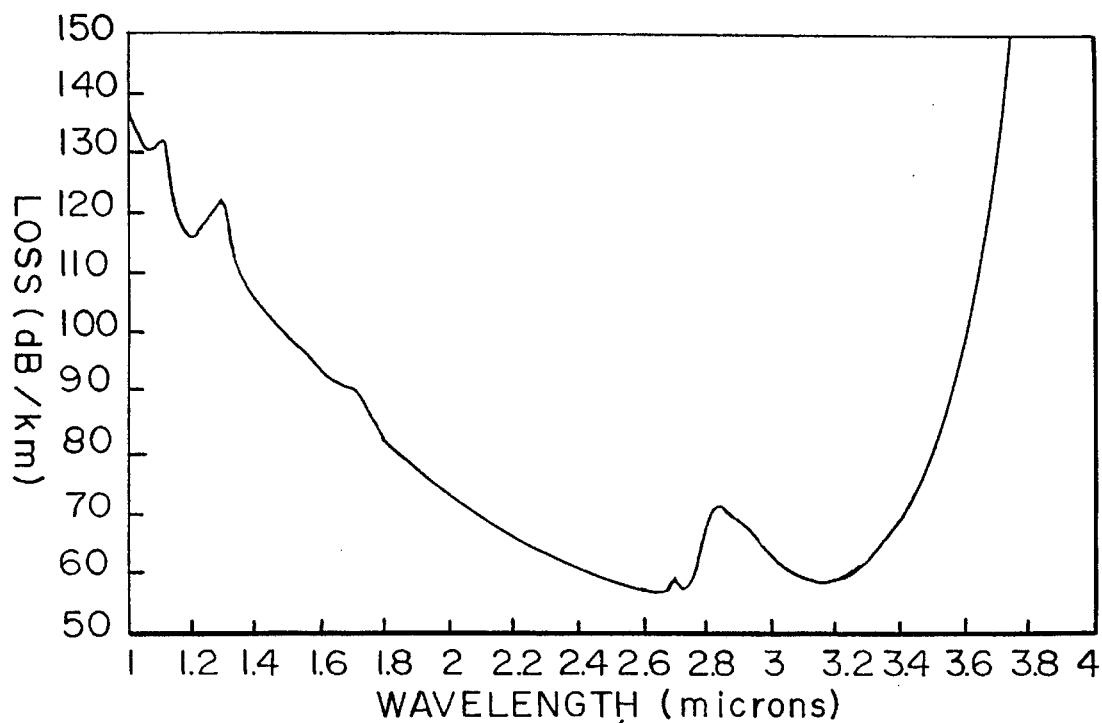
FIGS. 3 and 4 are graphs showing the slope of the optical loss plotted at wavelengths 1–2.4μ for selected samples identified in Table II cured at 460° C. and 300° C., respectively.
Figure 4:
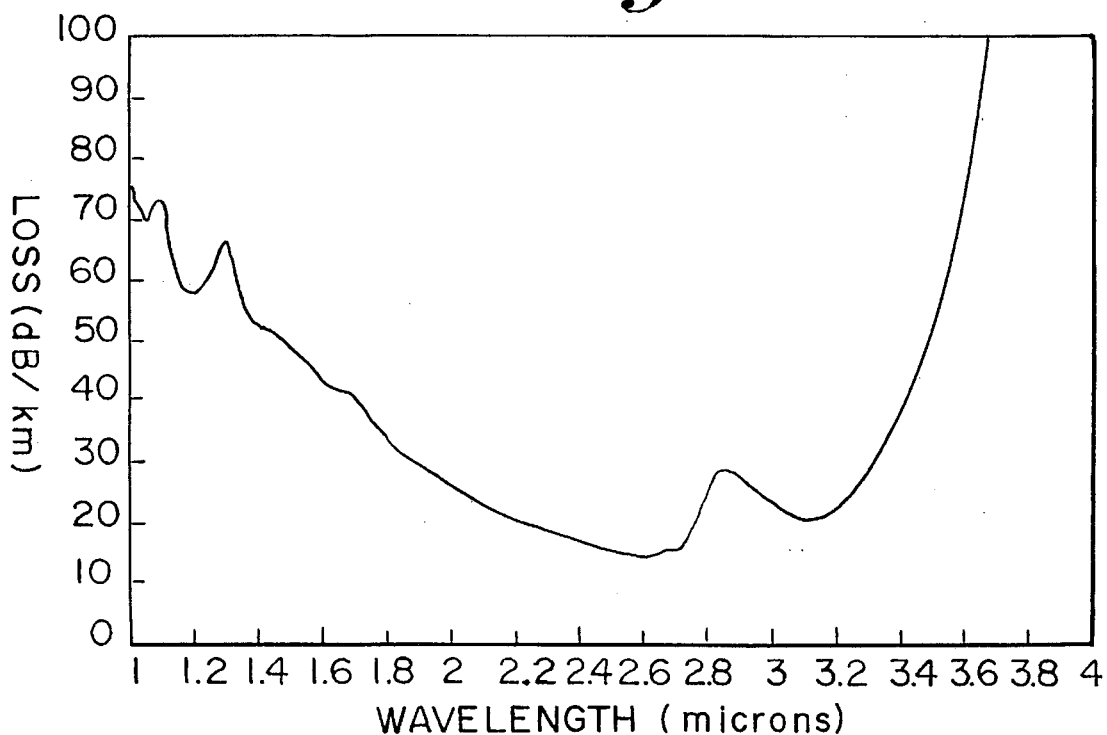

In the case of the sample #3 fibers cured at 460° C., the slope is much steeper at 1μ (80 dB/km) as shown in FIG. 3, indicating small size scattering centers. This is most likely attributed to crystallization due to too high a curing temperature. When cured at 360° C., as in the sample 4 fibers, FIG. 4 shows that the fibers exhibited the lowest loss (14 dB/km) of any of the fibers tested. FIG. 4 also shows that low losses of only 55 dB/km were achieved at a wavelength of 1μ. Unfortunately, as shown in Table IV below, when subjected to the underwater durability test described above, the sample 4 fibers showed only a small improvement in durability over the standard epoxy acrylate coated fibers. All 10 fibers of the sample 4 group broke within three hours, indicating that the coating was not properly cured.

Table IV shows the results of durability tests conducted on selected fibers identified in Table II.

TABLE IV

| Number of Surviving Fibers | Time (hours) |
| --- | --- |
| 8 | 0.61 |
| 3 | 2 |
| 2 | 2.5 |
| 0 | 3 |

To more completely cure the sample 4 fibers, they were heated in a separate curing oven at 190° C. for 20 hours. A dramatic improvement in durability resulted as is shown in Table V. Unfortunately, the fiber had been wound on a metal spool in the off line curing oven and remained coiled after treatment and thus difficult to use. The results of durability tests conducted on sample 4 fibers after they were subsequently cured off line for 20 hours at 190° C. are shown in Table V below.

Table V shows the results of durability tests conducted on selected sample fibers identified in Table II after the fibers were subsequently cured off line for 20 hours at 190° C.

TABLE V

| Number of Surviving Fibers | Time (hours) |
| --- | --- |
| 10 | 48 |
| 9 | 96 |
| 9 | 144 |
| 9 | 192 |
| 9 | 240 |
| 8 | 288 |

A shorter off line cure of 30 minutes at 170° C. provided a significant improvement in durability over the standard epoxy acrylate coated fibers, as shown in Table VI below. The fibers tested were 12 inches in length.

Table VI shows the results of durability tests conducted on sample 4 fibers from Table II after the fibers were cut to 12 inch pieces and subsequently cured off line for 30 minutes at 170° C.

TABLE VI

| Number of Surviving Fibers | Time (hours) |
| --- | --- |
| 8 | 24 |
| 5 | 48 |
| 4 | 96 |
| 3 | 144 |
| 3 | 192 |
| 2 | 240 |
| 2 | 288 |

Most practical and economical curing conditions are achieved by an on line cure. Thus, various on-line cure temperatures were tested to find the optimum temperature. Curing at 390° C., and under the conditions denoted for the sample 5 fibers of Table II resulted in coated fibers having low losses and high durability. Table VII shows the results of durability tests conducted on sample 5 fibers from Table II. As can be seen in Table VII, 50% of the fibers survived up to 72 hours in water under the stressed conditions. The optical loss of the sample 5 fibers from Table II was 22 dB/km and the slope of the loss plot between 1 and 2.5μ was the lowest one of the polyimide coated fibers which were tested and was comparable to the standard fibers as shown in FIG. 2.

TABLE VII

| Number of Surviving Fibers | Time (hours) |
|---|---|
| 9 | 3 |
| 8 | 6 |
| 6 | 8 |
| 5 | 48 |
| 5 | 72 |
| 2 | 96 |
| 2 | 144 |
| 2 | 192 |
| 2 | 240 |
| 2 | 288 |
| 2 | 336 |

Figure 5:
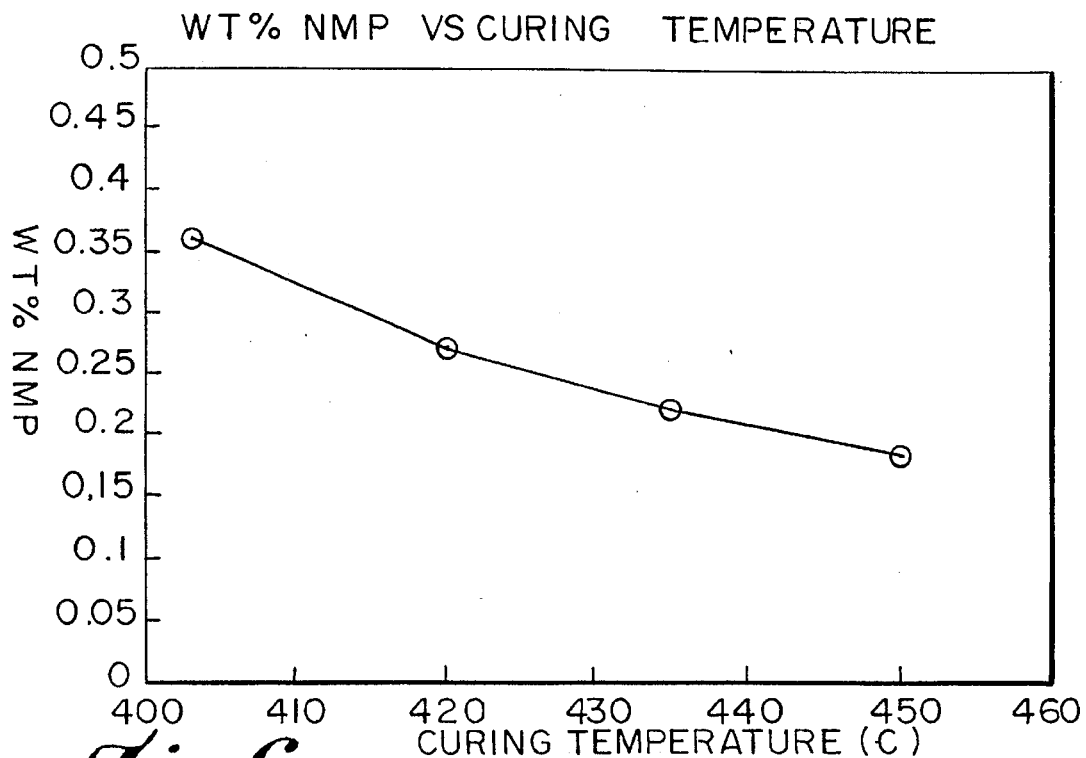
FIG. 5 is a graph showing the relationship between curing temperature and weight percent residual NMP in the coating.

FIG. 5 is a graph showing the relationship between curing temperature and weight percent residual NMP in the coating. As can be seen, the higher the curing temperature, the more complete the solvent evaporation and the formation of a fluorine containing thermoplastic polyimide.

Figure 6:
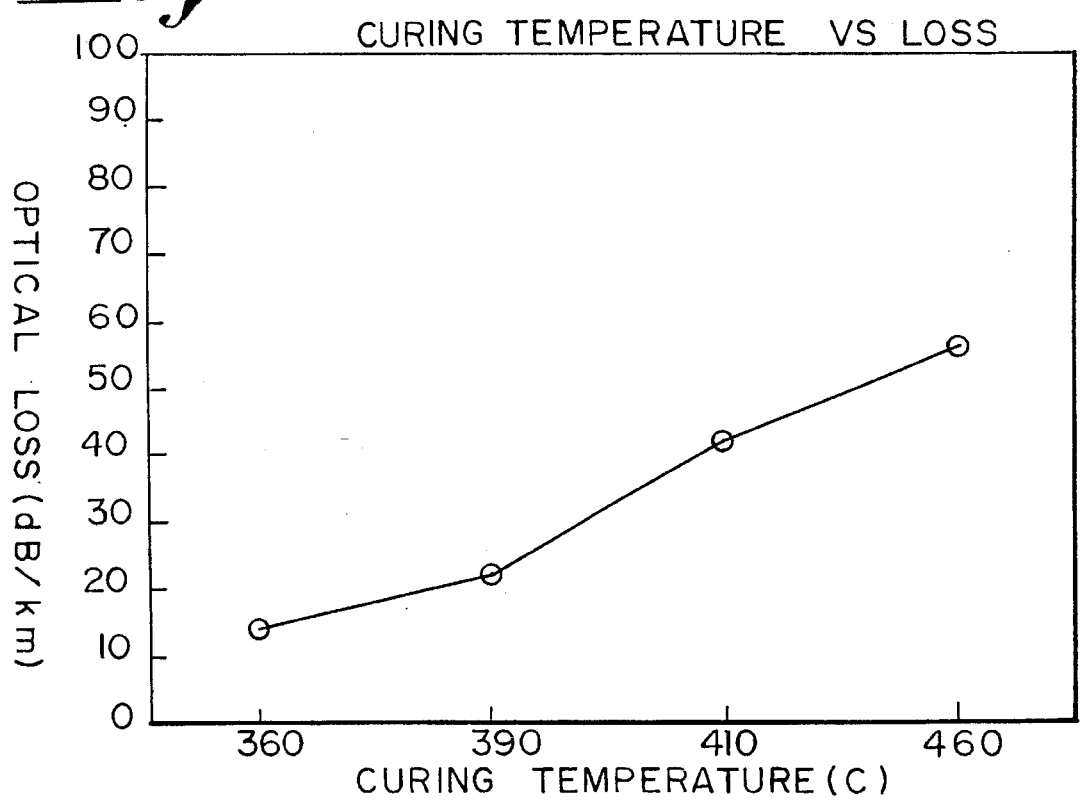
FIG. 6 is a graph showing the relationship between curing temperature and optical loss of fibers cured at such temperatures.

FIG. 6 is a graph showing the relationship between curing temperature and optical loss of fibers cured at such temperatures. As can be seen from FIG. 6, higher curing temperatures resulted in higher optical loss.

According to the present invention, it is possible to tailor the curing process to high temperatures so as to maximize fiber durability if higher losses can be accepted. Lower losses can also be achieved if a moderately extended fiber life time can be accepted. At curing furnace temperatures of between about 390° and 410° C., polyimide coated heavy metal fluoride fibers can be produced which exhibit low optical losses and high durability and life time.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method of making a polyimide coated heavy metal fluoride fiber comprising the steps of:

forming a coated optical fiber by drawing a heavy metal fluoride fiber through a polyimide solution, said fiber having a glass transition temperature in a range of about 200° and about 400° C. and said coating having a curing temperature in a range of about 200° and about 390° C.;

drawing said coated fiber through a curing oven to form a cured coated fiber, said oven having a temperature profile which exposes said coated fiber to a temperature above the glass transition temperature of the heavy metal fluoride fiber sufficient to cure said coating, said step of drawing through said oven occurring at a rate sufficient to minimize crystallization of said fiber and optical losses caused by crystallization.

2. A method according to claim 1, further comprising the steps of coating said cured coated fiber with an epoxy acrylate coating and curing said epoxy acrylate coating.

3. A method according to claim 1, wherein said coated fiber is drawn through said oven at a rate in a range of about 1 and about 12 meters per minute.

4. A method according to claim 1, wherein said coated fiber is drawn through said oven at a rate in the range of about 2 and about 6 meters per minute.

5. A method according to claim 1, wherein said coated fiber is drawn through said oven at a rate in the range of about 2 and about 3 meters per minute.

6. A method according to claim 1, wherein the maximum temperature along the oven temperature profile is between about 420° and about 520° C.

7. A method according to claim 1, wherein the maximum temperature along the oven temperature profile is in a range of about 460° and about 480° C.

8. A method according to claim 1, wherein the maximum temperature along the oven temperature profile is about 460° C.

9. A method according to claim 1, wherein said coated fiber is exposed to a maximum temperature along the oven temperature profile for between about five and about seven seconds.

10. A method according to claim 1, wherein said fiber is drawn from a glass preform which is substantially free of silica and oxides and contains at least one member selected from the group consisting of fluorides of: zirconium, barium, lanthanum, aluminum, sodium, lithium, hafnium, beryllium and lead.

11. A method according to claim 1, wherein said polyimide solution comprises a fluorinated polyimide.

12. A method according to claim 1, wherein said coated fiber has a polyimide coating thickness in a range of about 3 and about 25 microns.

13. A method according to claim 1, wherein said coated fiber has a polyimide coating thickness in a range of about 5 and about 20 microns.

14. A method according to claim 1, wherein said coated fiber has a polyimide coating thickness in a range of about 8 and about 10 microns.

15. A method according to claim 1, wherein the total exposure time of the fiber to the oven temperature profile is in a range of about 10 and about 20 seconds.

16. A method of making a polyimide coated heavy metal fluoride optical fiber comprising the steps of:

forming a coated fiber by drawing a heavy metal fluoride fiber through a fluorinated polyimide solution such that the solution forms a coating on said fiber, said fiber having a glass transition temperature in a range of about 200° and about 400° C. and said coating having a curing temperature of less than 300° C.;

drawing said coated fiber through a curing oven at a rate in a range of about 1 and about 12 meters per minute to form a cured coated fiber, said oven having a temperature profile which exposes the coated fiber to a maximum temperature in a range of about 420° and about 520° C., said coated fiber being exposed to said temperature profile for up to about 20 seconds to minimize crystallization of said fiber and optical losses caused by crystallization.

17. A coated heavy metal fluoride fiber produced by the method according to claim 16.

18. A method of making a polyimide coated chalcogenide fiber comprising the steps of:

forming a coated chalcogenide fiber by drawing a chalcogenide fiber through a polyimide solution such that the solution forms a coating on said fiber, said coating having a curing temperature in a range of about 200° and about 390° C.;

drawing said coated chalcogenide fiber through a curing oven to form a cured coated fiber, said oven having a temperature profile which exposes the fiber to a maximum temperature in a range of about 420° and about 520° C. and sufficient to cure said coating, said drawing through said oven occurring at a rate sufficient to minimize crystallization of said fiber and optical losses caused by crystallization.

19. A method of making a coated heavy metal fluoride fiber comprising the steps of:

forming a coated optical fiber by drawing a heavy metal fluoride fiber through a curable coating solution to form a coated fiber, said fiber having a glass transition temperature and said curable coating solution having a curing temperature which is higher than said glass transition temperature;

drawing said coated fiber through a curing oven to form a cured coated fiber, said oven having a temperature profile which exposes said coated fiber to a temperature above the glass transition temperature of the heavy metal fluoride fiber and sufficient to cure said curable coating solution, said step of drawing through said oven occurring at a rate sufficient to cure said curable coating solution and to minimize crystallization of said fiber and optical losses caused by crystallization.

20. A coated optical fiber comprising a fiber having a glass transition temperature and a coating applied to said fiber and having a curing temperature which is higher than said glass transition temperature, said coating having been formed from a solution containing a solvent which absorbs heat during evaporation and solution curing, said solution having been treated at a maximum temperature which is above said glass transition temperature and in an oven having a temperature profile and atmosphere to cure said coating while minimizing crystallization of the fiber and optical losses caused by crystallization, and wherein said coating has a thickness in the range of about 8 and about 10μ.

21. A polyimide coated heavy metal fluoride fiber comprising a heavy metal fluoride fiber having a thermoplastic fluorinated polyimide coating, said coating having been formed from a solution of polyamic acid and solvent wherein said polyamic acid has a monomer composition and backbone structure such that the coating has a curing temperature in a range of about 200° and about 390° C., said coating having a thickness in a range of about 3 and about 25μ and having been applied on said fiber and cured at a temperature above the glass transition temperature of the fiber and under conditions which cure said coating and minimize crystallization of said fiber and optical losses caused by crystallization, said coated fiber having an optical loss of about 56 dB/km or less and a durability such that at least 5 of a group of 10 such fibers survive a two point bend test using a 2.5 inch bend test radius while submersed in deionized water.

22. A polyimide coated heavy metal fluoride fiber as claimed in claim 21, wherein said coating has a thickness in a range of about 5 and about 20μ.

23. A polyimide coated heavy metal fluoride fiber as claimed in claim 21, wherein said coating has a thickness in a range of about 8 and about 10μ.

24. A coated optical fiber comprising a fiber having a glass transition temperature and a coating applied to said fiber and having a curing temperature which is higher than said glass transition temperature, said coating having been formed from a solution containing a solvent which absorbs heat during evaporation and solution curing, said solution having been treated at a maximum temperature which is above said glass transition temperature and in an oven having a temperature profile and atmosphere to cure said coating while minimizing crystallization of the fiber and optical losses caused by crystallization, wherein said fiber is a heavy metal fluoride fiber doped with at least one member selected from the group consisting of Praseodymium, Neodymium, Promethium, Samaria, Europium, Gadolinium, Terbium, Dysprosium, Holmium, Erbium, Thulium, Ytterbium, Lutecium, and combinations thereof.

25. A coated optical fiber as claimed in claim 24, wherein said curing temperature is at least 100° C. above said glass transition temperature.

26. A coated optical fiber as claimed in claim 24, which exhibits an optical loss of about 56 dB/km or less.

27. A coated optical fiber as claimed in claim 24, wherein said curing temperature is in the range of about 200° C. and about 390° C.

28. A coated optical fiber as claimed in claim 24, wherein said maximum temperature is in the range of about 405° C. and about 520° C.

29. A coated optical fiber as claimed in claim 24, wherein said fiber is a single mode fiber.

30. A coated optical fiber as claimed in claim 24, wherein said fiber is a multi-mode fiber.

* * * * *